J. MARTIN.
HYDRANT COCK.
No. 1,972. Patented Feb. 10, 1841.
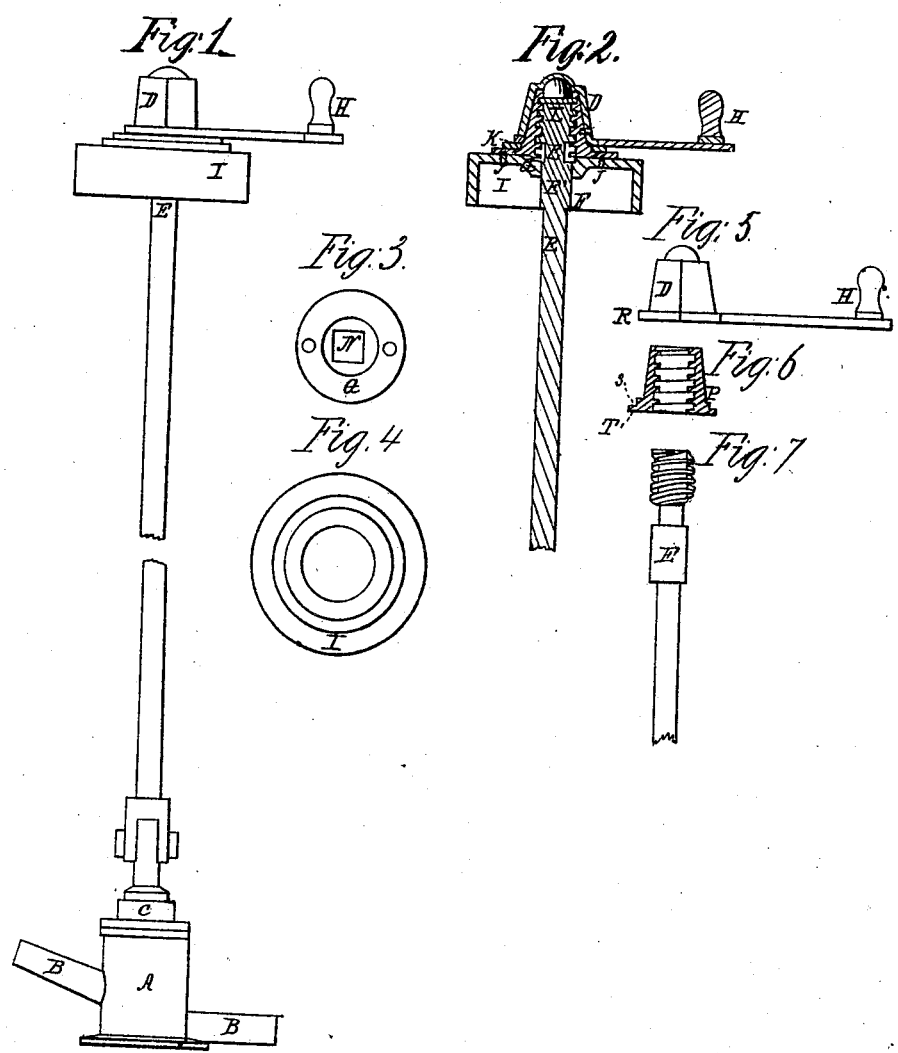

UNITED STATES PATENT OFFICE.

JOSEPH MARTIN, OF BALTIMORE, MARYLAND, ASSIGNOR TO EBENEZER H. HUBBALL.

METHOD OF CONSTRUCTING COCKS FOR HYDRANTS OR OTHER PURPOSES BY PRODUCING A PERPENDICULAR LIFT OF THE PISTON.

Specification of Letters Patent No. 1,972, dated February 10, 1841.

*To all whom it may concern:*

Be it known that I, JOSEPH MARTIN, of the city of Baltimore and State of Maryland, have invented a new and useful Improvement in the Construction of Cocks for Hydrants and other Purposes, which is described as follows, reference being had to the annexed drawings of the same, making part of this specification.

Figure 1 is an elevation, Fig. 2 section, Fig. 3 plan of plate *b*, Fig. 4 plan of stock I, Fig. 5 revolving cap detached, Fig. 6 section of female screw, Fig. 7 piston rod detached.

Similar letters refer to similar parts in the figures.

The cylinder A, tubes B, piston and screw C for securing the piston are made in the usual manner.

The improvement consists principally in the revolving screw cap D and its mode of action in the top coupling causing the screw head piston rod E to be lifted vertically in a square opening N in a circular plate *b* screwed to this stock I without its having any horizontal movement—thus preventing the wear of the piston and consequent leakage as heretofore experienced.

The cap D is made hollow to admit a nut P shaped on the outside like a frustum of a cone and the inside formed into a female screw to correspond with a male screw on the upper end of the piston rod which is to rise and fall therein and which nut is increased in diameter near the larger end to form a shoulder S upon which the cap is to rest and still more increased in diameter at the lower end just below said shoulder, forming a circular tongue T which is to turn in a circular groove formed in the stock in the manner hereafter described. The cap D is likewise enlarged in diameter at the lower end so as to form a circular rim R which rests upon the shoulder of the nut before mentioned over which shoulder said rim projects or hangs thus forming a circular groove around the outside of the nut into which a tongue K of the stock enters and over which the cap revolves— the said cap and nut being screwed together so as to form one piece and turned by the same handle H—horizontally upon a circular plate *b* screwed from the under side to the stationary stock I by means of screws J J. In this plate *b* is made the square opening N in which the square part E′ of the piston rod rises and falls and which prevents it from turning horizontally.

The casting I called the stock is a hollow cylinder open at the lower end and closed at the upper end except when a square opening is left in the plate *b* for the square part of the piston rod to move in, which plate *b* forms part of the closing head of the upper end of the said cylindrical stock. The upper opening in the casting I is of the same diameter as the shoulder S of the nut. Below this part of the casting the diameter of the opening is increased so as to form a seat for the circular rim T of the nut which turns therein. Below this seat the diameter of the opening is again increased so as to form a seat for the circular plate *b*.

The upper end of the piston rod E is a male screw corresponding in thread with the nut P which is made to turn over it to the right or left. Below the male screw it is decreased in diameter forming a cylindrical neck and below this neck it is made square of greater diameter. The lower part is made in the usual manner.

To raise the piston rod to open the valve turn the cap D to the right. This will cause the piston rod to rise vertically—the nut always turning on the plate *b*. To close the valve turn the cap to the left which will screw the rod down in a vertical position without having any horizontal or grinding movement upon the valve seat.

The invention claimed and desired to be secured by Letters Patent consists in—

Lifting the valve vertically without any horizontal or grinding movement on its seat by means of the before described revolving screw cap and screw head piston rod whether constructed and arranged precisely in the manner above described, or in any other mode substantially the same.

JOSEPH MARTIN.

Witnesses:
SAM. PURVEANCY,
WILLIAM WARFIELD,